United States Patent [19]

Oppy et al.

[11] 4,371,557
[45] Feb. 1, 1983

[54] MAINTENANCE OF PROTEIN QUALITY IN FOODS CONTAINING REDUCING SUGARS

[75] Inventors: Maureen A. Oppy, Bourbonnais; Dayle A. S. Nelson, New Lenox, both of Ill.

[73] Assignee: General Foods Corporation, White Plains, N.Y.

[21] Appl. No.: 226,671

[22] Filed: Jan. 21, 1981

[51] Int. Cl.³ .......................... A23K 1/00; A23K 1/10
[52] U.S. Cl. ................................. 426/321; 426/332; 426/656; 426/657; 426/805
[58] Field of Search ............... 426/325, 321, 630, 635, 426/656, 332, 657

[56] References Cited

U.S. PATENT DOCUMENTS

| | | | |
|---|---|---|---|
| 3,202,514 | 8/1965 | Burgess et al. | 426/805 X |
| 3,415,655 | 12/1968 | Hino et al. | 426/656 X |
| 3,617,307 | 11/1971 | Inklaar | 426/332 |
| 3,900,578 | 8/1975 | Turos | 426/656 X |
| 3,911,146 | 10/1975 | Hara et al. | 426/265 |
| 3,922,365 | 11/1975 | Ney et al. | 426/656 X |
| 3,946,123 | 3/1976 | Hanna | 426/805 X |
| 4,058,633 | 11/1977 | Staff et al. | 426/646 X |
| 4,282,254 | 8/1981 | Franzen et al. | 426/805 X |

Primary Examiner—Robert A. Yoncoskie
Attorney, Agent, or Firm—Thomas R. Savoie; Daniel J. Donovan

[57] ABSTRACT

The object of the invention is to provide an improved proteinaceous food product and a process for preparing it.

The current commercial production of proteinaceous food products often employs the use of reducing sugars under conditions which result in the loss of protein quality due to the Maillard reaction. The present invention improves upon these food products and provides a process for stabilizing the protein quality of them.

According to the invention, an effective amount of a non-essential free amino acid is incorporated into the food composition to save the protein quality from degradation. A preferred group of products are intermediate moisture products, particularly pet foods, which contain reducing sugars such as corn syrup and high fructose corn syrup to serve as water binders. The preferred non-essential amino acid additive according to the present invention is glycine and its soluble salts.

3 Claims, No Drawings

MAINTENANCE OF PROTEIN QUALITY IN FOODS CONTAINING REDUCING SUGARS

TECHNICAL FIELD

The present invention relates to proteinaceous food products, and more particularly to improved food products wherein protein quality is maintained despite the occurrence of the Maillard reaction or severe process conditions and the the method for preparing these products.

In addition to carbohydrates, fat, vitamins and minerals, proper nutrition for humans and animals alike requires protein in the proper quantity and of the proper quality. The amount of protein required in the diet is determined by how well the protein supplies the required amino acids to the body tissues. The more closely these needs are approached, the lower will be the percentage of protein required.

Proteins are, in effect, complex high polymer materials containing carbon, hydrogen, oxygen, nitrogen, and sometimes sulfur. The polymer is formed of interconnected amino acids linked by bonds between a carboxyl group of one and an amino group of the next. The body is capable of turning nitrogen compounds into most of these amino acids, and any source of dietary nitrogen will enable the body to properly grow and function in the absence of these particular amino acids. However, other amino acids cannot be synthesized by the body and must be taken into the body as part of the diet. These amino acids are essential. Generally recognized as essential amino acids are histidine, isoleucine, leucine, lysine, methionine, phenylalanine, threonine, tryptophan, and valine. There are other amino acids which become more important at various stages in the life cycles of animals and humans or under certain diseased or abnormal conditions. However, the listed amino acids are generally referred to as essential amino acids.

Because of the dual requirement that the diet contain not only sufficient quantities of protein, but protein containing the correct balance of amino acids, the art has defined a method for determining the quality of protein materials. By this procedure, a protein efficiency ratio (PER) is determined.

PER is determined by the ratio of weight gained by rats over a period of four weeks to the weight of protein consumed in the diet. Therefore, weanling rats are fed a standardized diet containing either the material being tested or an Animal Nutrition Regent Council (ANRC) Casein (control) as the sole source of protein. Diets are balanced to contain identical standardized levels of all nutrients, including protein. Only the source of the protein differs. To correct for natural biological variations, PER of the test food is multiplied by a factor equal to 2.50 divided by the observed PER of the ANRC casein. In orther words, ANRC casein has a theoretical PER of 2.50. The official method for PER is the Association of Official Analytical Chemists (A.O.A.C.) 12th Ed. paragraph 43.184; 1975. The diets were modified for A.O.A.C. specifications as follows: moistures to 14.8%; fiber to 3%; Bernhart Tomarelli mineral mix to 5%; corn oil to 8%. Theoretically, then, a food product can be designed to contain a specific dietary requirement for protein in terms of both quantity and quality.

Unfortunately, the quality of the protein in many food products has been found to decrease under certain conditions of storage or processing. It has been known for some time that the reaction of amino acids with carbonyl groups, such as aldehydes present in reducing sugars, causes a darkening of color, flavor change, and loss of protein quality as an aldol condensation reaction known as the Maillard reaction proceeds. While this reaction does not reduce the overall nitrogen content of the food products, it removes some of the nitrogen from the form of essential amino acids, thereby reducing the overall protein quality of the food product. There remains a present need for stabilizing protein quality in foods subject to the Maillard reaction.

BACKGROUND ART

The prior art has recognized the importance of preparing food products having high quality protein and has suggested a number of specific procedures for achieving this goal. For example, in U.S. Pat. No. 2,344,229 to Block et al., it is disclosed that animal foods prepared especially for chickens and dairy cows can be fortified with essential amino acids to reduce the required percentage of protein in the product. In addition to the usual listing of amino acids, it is indicated that glycine, usually considered a non-essential amino acids, can be required by some animals under certain conditions, especially as a detoxicating agent or to promote growth of chicks. Also along this line, Cornelius et al. in U.S. Pat. No. 4,024,286, disclose the fortification of foodstuffs by the addition of a bland methionine dipeptide containing glycine, alanine, valine, or glutamic acid as the second amino acid.

Other patents have suggested adding specific amino acids or reaction mixtures of these as flavoring materials. Specifically, U.S. Pat. No. 3,524,747 to O'Hara et al. teaches the preparation of a seasoning composition containing amino acids, organic acids, nucleotides, and reducing sugars which is said to have a meat-like flavor after heating. Glycine is listed among other non-essential amino acids as being possible ingredients in this reaction mixture. It is also noted that other prior art indicates that glycine can be employed as a sweetener in certain food products. Also, in U.S. Pat. No. 3,922,365 to Ney et al., a mixture of at least three amino acids, with glycine as an optional component, is said to impart a ripe cheese-like flavor to foodstuffs.

Yet other patents have suggested the use of nonessential amino acids including glycine in various connections with color retention in proteinaceous food products; however, none of these references relate to the stabilization of protein quality against the adverse effect of the Maillard reaction or processing conditions. For example, in U.S. Pat. No. 3,552,978 to Inklaar, it is disclosed that certain amino acids or salts which have a buffering capacity in aqueous solution can be employed to improve qualities of moisture retention, color retention, texture and taste. The disclosure of U.S. Pat. No. 3,617,307 is a continuation-in-part of that Inklaar patent and identifies the further advantage that such additives enable the use of extra protein without the formation of deleterious jelly and fat deposits. Also relating to color stabilization is U.S. Pat. No. 3,911,146 to Hara et al. which discloses that the color of meat can be preserved by contacting it with water-soluble ingredients of edible vegetal matter and that this effect can be enhanced by the addition of amino acids. Thus, while relating broadly to color retention, none of the patents teach or suggest the use of glycine to stabilize the protein quality of a food product containing protein and reducing sugars.

DISCLOSURE OF INVENTION

The invention provides improved proteinaceous food products wherein the protein quality is maintained despite the presence of conditions normally conducive to the Maillard reaction, and to a method for preparing food products of this type.

The improved proteinaceous food compositions comprise a reducing sugar and moisture in amounts normally susceptible to causing the loss of protein quality due to the Maillard reaction or other processing conditions, wherein the improvement comprises employing as part of the food composition: a free, non-essential amino acid or a soluble salt thereof in an amount which is effective to stabilize the protein quality. The process according to the invention comprises modifying a proteinaceous food composition comprising a reducing sugar and moisture in amounts which render the composition normally susceptible to the loss of protein quality due to the Maillard reaction or other processing conditions, by incorporating into the food composition a free, non-essential amino acid or soluble salt thereof in an amount which is effective to stabilize the protein quality.

The present invention has application to a wide variety of food products which contain protein which is subject to a reduction in quality due to the Maillard reaction or other processing conditons. This loss can occur either during the relatively shorter time intervals involved during processing or during storage for extended periods of time. The food compositions can be finished food products ready for consumption, or they can be ingredients or mixes intended for use in the preparation of final food products.

The Maillard reaction becomes increasingly active with increasing moisture contents. Thus, those compositions containing more than about 12% water based on the weight of the food, and those normally considered moist or semi-moist food products, will be most susceptible to loss of protein quality due to the Maillard reaction. Among these products will be those prepared for human as well as animal consumption.

The problem of protein quality loss by the Maillard reaction is accelerated by heat. Thus, retorted, canned proteinaceous food compositions and those which are intended for storage and distribution in the dry state are also in need of improvement according to the present invention. The elevated temperatures which are employed to dry the products from elevated moisture contents to their final stable condition accelerate the loss of protein quality. Among these products are dry pet foods such as described in U.S. Pat. No. 4,104,407 to Stringer et al. The invention is applicable also to dry food compositions which were prepared by processes which did not bring the protein and reducing sugars together under moist heat prior to packaging, but which must be prepared for final use by heating in the presence of moisture.

Another factor which tends to decrease the protein quality is attributed to processing conditions. The conditions most responsible for the decrease in the PER are temperature and pressure. A conventional method used to maintain PER has been to add an amount of essential amino acid in excess of that amount which is depleted by the processing conditions. This method has proven very unsatisfactory because of costs and undesireable odors attributed to selected essential amino acids such as methionine. Methionine when used in excess will produce sulfur like odors. This invention obviates these problems by using non essential amino acids, preferably glycine, which are less costly than many of the essential amino acids and does not contribute to undesirable odors. In addition, the non-essential amino acid is believed to be sacrificial in nautre; that is they are depleted before the essential amino acids.

BEST MODE FOR CARRYING OUT THE INVENTION

The following description is intended to describe, in terms which can be understood by the person of ordinary skill in the art, the best mode presently contemplated for carrying out the invention, but is not intended to be a statement that the principles underlying the invention are limited to this specific emboidment. Indeed, as is described above, the invention is applicable to any food composition wherein the Maillard reaction or other processing conditions will adversely affect protein quality.

The problem of the Maillard reaction is especially pronounced in intermediate moisture food products intended for human and animal consumption. These products typically contain at least 15% moisture, but are rendered stable against microbial attack by the presence of water binders such as sugars which decrease the availability of water for the growth and reproduction of microbes, and minor amounts of anti-microbial materials which directly attack the organisms.

Among the water binding sugars employed in commercial products are reducing sugars such as fructose, glucose, dextrose, maltose, corn syrup and honey. Corn syrup and enzymatically converted high fructose corn syrups are especially good sources of sugars for products of this type. The component sugars are predominantly monosaccharides which have high sweetening values in addition to their high water binding capacity. This combination of desirable properties would make them ideal for use that were not for their adverse effect on color and protein quality due to the Maillard reaction. Over the normal shelf life of these products, a noticeable darkening occurs making the product less appealing to the prospective purchaser; and, at the same time, the protein quality of the product is reduced making it less beneficial to the ultimate consumer. Where this reaction is permitted to occur, adjustment in the protein quality must be made before the product can be sold as a nutritionally complete food. Thus, for very practical purposes, the following description will focus on intermediate moisture food products of this type, as more specifically described in U.S. Pat. No. 3,202,514 to Burgess et al. This patent is specifically incorporated herein by reference in its entirety.

While not wanting to be bound to any particular theory of operation, it appears that the useful non-essential amino acids which can be employed according to the present invention are those which react rapidly with the reducing sugars present in food compositions to prevent reaction with the essential amino acids. Thus, the non-essential amino acids added according to the present invention are sacrificial in nature, scavenging the highly reactive reducing sugar groups and preventing their reaction with the essential amino acids which play an important part in the quality of the protein.

Among the specific non-essential amino acids which can be employed according to the present invention are glycine, arginine, serine, and alanine. Of these, the glycine is presently preferred. To be effective, these non-essential amino acids must be in their free amino form, i.e., they should not be bound within a more complex peptide or protein structure. However, when desired, they can be employed in the form of non-toxic, soluble salts.

The rate at which the Maillard reaction occurs is dependent upon the moisture content, the availability of free amino acids to react with a reducing sugar, and the availability of reducing sugar groups. In the context of intermediate moisture food products, low levels of reducing sugars, on the order of about 5% or less, present no significant problem with regard to loss of protein quality. However, at levels above this, and especially at levels above about 8% based on the total weight of the composition, the problem becomes pronounced. At levels of 12% or more of reducing sugars, the Maillard reaction causes extreme protein quality modification.

According to the invention, it has been found that with intermediate moisture products having reducing sugar levels on the order mentioned, levels of non-essential amino acids on the order of from 0.25 to about 1.0%, based on the total weight of the composition, will provide effective results. These products typically have protein contents of from about 15 to 25%, preferably from about 18 to 22%. Where the moisture, reducing sugar, free amino acid content, and processing and storage conditions are less favorable to the promotion of the Maillard reaction, levels toward lower end and even below this range can be employed. However, where the combination of these factors is more favorable to the Maillard reaction, levels close to 1% or even in excess thereof may be required. Too high levels may hurt PER via a dilution effect. Therefore there is an upper limit, although that limit may or may not vary with formulation and processing conditions plus extent of which reaction goes on.

The obtainment of a stable, high protein efficiency ratio (PER) by the addition of a non-essential amino acid is surprising in a number of regards. First, one would expect that the overall protein quality of the product would be reduced by the addition of the non-essential amino acids due simply to the dilution effect of the addition. Secondly, it would be expected that the addition of unnecessary free amino acids would actually promote the reaction and produce a number of undesirable results in terms of increased darkening and intensified off-flavors. Further, it surprisingly appears that there is some degree of criticality which attaches to the level below a threshold amount depending upon moisture and reducing sugar contents are ineffective whereas levels above a higher amount tend to decrease protein quality. For dry and canned pet food products, and must other food compositions which do not contain high reducing sugar contents, will typically require only about 0.05 to 0.25% of the free amino acid additive according to the present invention.

The preferred pet food compositions which are improved according to the present invention are nutritionally-balanced pet foods. By nutritionally balancing each individual food fed to a particular pet, it is not necessary for the pet owner to individually balance the quantities of the different foods supplied. Thus, the nutritional intake of the pet is assured as long as it consumes the minimum amount of food. Such nutritionally-balanced foods will contain protein, carbohydrates, fats and vitamins and minerals in the amounts established by feeding tests to be sufficient for proper growth and maintenance of that particular species of pet. In the most preferred embodiment, the pet food product will have a PER of 2.5 or better.

The preparation of intermediate moisture dog foods has become well established since the invention of Burgess et al. in U.S. Pat. No. 3,202,514. The present invention provides an improvement on the invention of Burgess et al. by permitting the use of higher levels of reducing sugars than previously thought possible, without causing the degree of loss of protein quality which would normally be associated with such high reducing sugar levels.

To obtain shelf stability, the final pet food products are made with reduced moisture contents, i.e., from about 15 to 50% moisture and contain sufficient suitable preservatives to obtain the requisite shelf stability. Among these preservatives are reducing sugars such as corn syrup and high fructose corn syrup which control microbiological growth while at the same time taking part in the Maillard reaction. It is the advantage of the present invention that the preservative system can contain high levels of reducing sugars without adversely affecting the quality of the protein in the final product.

The materials chosen to afford a balanced and complete animal ration will preferably include a proteinaceous meaty material, a vegetable protein source, a ration-balancing protein supplement and other nutritional supplements, although one or more of these compounds may be omitted depending upon animal preference and nutritional requirements. The term "proteinaceous meaty material" refers to the group consisting of meat, meat by-products and meat meal as well as mixtures of these. The term "meat" is understood to apply not only to the flesh of cattle, swine, sheep and goats, but also horses and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. Likewise, the term "meat meal" refers to the finely ground, dry rendered residue from animal tissues including those dried residues embraced by the term in the aforesaid official definition of the Association of American Feed Control Officials, Incorporated. Indeed, the terms "meat", "meat by-products", and "meat meal" are understood to apply to all of those animal, poultry and marine products defined by said Association.

The term "vegetable protein sources" applies to oil seeds and legumes; as well as the oil-expressed or extracted meals and cakes and protein isolates thereof recovered by acid or alkali digestion and precipitation; typical of such vegetable protein sources are soybean, soybean meal, cotton seed meal, peanuts, peanut meal, etc., all of which terms are well understood and similarly defined or understood by said Association.

The term "ration-balancing protein supplement" is intended principally to refer to milk products as defined by said Association and hence includes such additives as dried butter milk, dried skimmed milk, dried whole whey, casein and cheese rind, although it also includes yeast as that term is defined by said Association and hence refers to such materials as distillers' dried yeast, primary dried yeast, irradiated dried yeast, brewers' dried yeast and torula dried yeast. However, the term protein supplements is not to be understood as restricted to the aforesaid definition.

Because it is desirable to have a soft texture as well as to control its water activity ($A_w$) for bacteriological purposes, plasticizing polyhydric alcohols are preferably employed. Suitable among these for use as the plasticizing agent are any of the normally liquid, edible di-, tri- or other polyhydric alcohols or sugar alcohols effective for the purpose. Typical among these are 1,2-propanediol, 1,3-butanediol, glycerol, and mixtures of these. It has been found that due to its highly effective plasticizing effect, glycerol is a preferred material. The exact level of polyhydric alcohol will be determined on the basis of the considerations of $A_w$, moisture content, microbial stability and textural stability, and will vary in response to changes in a number of variables. It has been found, however, that the polyhydric alcohols are highly desirable plasticizers and are desirably employed at levels of up to about 25%, with levels of from 5 to 20% based on the total weight of the food being preferred.

The food must have the requisite moisture content, as discussed above, in combination with an effective level of water-binding materials to bring the $A_w$ to within the range of from 0.50 to 0.90. Preferably, the $A_w$ will be within the range of from 0.80 to 0.88. Any material capable of bringing about the desired reduction in water activity of the product while still allowing it to retain its desirable textural properties can be employed. Typical of these are the low molecular weight soluble solids, capable of imparting a strong osmotic pressure effect on the water present in the formulation, as discussed in Burgess et al. U.S. Pat. No. 3,202,514. Representative of these are salts such as sodium chloride, sugars such as sucrose, glucose, fructose, maltose and dextrose, high DE corn syrups, high fructose corn syrups, and polyhydric alcohols such as those listed above. In addition, any other suitable water binding materials can be employed.

To prepare the pet food, the ingredients can be processed in any suitable manner to achieve the desired taste, nutritional and textural criteria. the food can be prepared by mixing all of the ingredients, including the added non-essential amino acid according to the invention, in the proper amounts and shaping the mixture to directly achieve the necessary moisture, $A_w$ and textural criteria. Alternatively, the process can include a subsequent heating, infusing or other treating step to adjust any one or all of these parameters. For example, the ingredients can be prepared and processed as discussed in the foregoing Burgess et al patent, followed by subsequent drying of the product and/or infusion with additional $A_w$ lowering or plasticizing material to achieve the necessary product characteristics. As another example, moisture and plasticizer levels can be employed effective to produce the necessary product characteristics of this invention directly upon exiting the extruder. In a variation of that procedure, the moisture level might be maintained somewhat higher than necessary according to this invention to enable more efficient extrusion, but then following the extrusion procedure with a drying step to reduce the moisture content. Additionally, the extruded material can be infused with a plasticizer such as glycerine or 1,2-propane diol either before or after the drying step.

The following examples are presented for the purpose of illustrating and explaining the present invention and are not to be taken as limiting in any regard. Unless otherwise indicated, all parts and percentages are by weight.

EXAMPLE 1

According to this example, an intermediate moisture dog food product is prepared according to conventional processing except for the incorporation therein, according to this invention, of the non-essential amino acid glycine to stabilize protein quality of the product. This product according to the invention is compared to a control formulation which is identical in all respects except that it does not contain the glycine added according to the invention.

The pet food is prepared from the following ingredients:

| Ingredient | Parts by Weight |
| --- | --- |
| Salt | 1.20 |
| Soybean Oil Meal | 24.50 |
| Soybean Grits | 15.02 |
| Oil and Tallow | 1.43 |
| Methionine | 0.33 |
| Potassium Sorbate | 0.10 |
| Glycine | 0.50 |
| Meat-by-Products | 25.00 |
| Corn Syrup | 20.00 |
| Propylene Glycol | 5.20 |
| Sodium Carboxymethylcellulose | 0.25 |
| Dried Whey Product | 0.50 |
| Vitamins/Minerals/Color/Flavor | 2.34 |
| Water sufficient for processing | 3.63 |
| | 100.00 |

These materials are processed into a pet food by: The dry ingredients are batched first and then mixed with the meat by products, corn syrup, soybean oil, propylene glycol, animal fat and water. The materials are mixed together for a short time and then heat processed through a steam jacketed cooker. The product from the cooker is cooled and then extruded into noodle like forms. Product is then packaged.

This product, having 0.5% glycine incorporated therein based on the total weight of the pet food composition, is compared against a control product not containing the added glycine and a casein control.

The results of the analysis are as follows:

| Product | Average Protein Efficiency Ratio |
| --- | --- |
| Pet food with 0.5% glycine | 2.58 |
| Control pet food | 2.37 |
| Casein control | 2.50 |

EXAMPLE 2

This example repeats the production of a pet food product according to the procedure of Example 1, but employs different non-essential amino acids in place of the free amino acid glycine. It is noted that gelatin is rich in glycine and is added at a level effective to provide 0.5% glycine based on the total weight of the food product. These products are compared with the product of the invention produced according to Example 1 and the casein control. The results are summarized as follows:

| Product | Protein Efficiency Ratio |
| --- | --- |
| Pet food with 0.5% glycine | 2.59 |
| Pet food with 0.3% glycine | 2.54 |
| Pet food containing 0.5% serine | 2.9 |
| Pet food containing 0.5% arginine | 2.74 |
| Pet food containing 0.5% alanine | 2.73 |
| Pet food containing 1.5% gelatin | 2.52 |
| Casein control | 2.50 |

The above description is for the purpose of enabling people having ordinary skill in the art to practice the invention. It is not meant to detail all of the obvious modifications and variations of the invention which will become apparent upon reading. It is intended, however, that these modifications and variations be included within the scope of the invention which is defined by the following claims.

What is claimed is:

1. An improved proteinaceous, nutritionally-balanced pet food composition containing a protein content of from 15 to 25% by weight, at least about 8% by weight reducing sugar and from 15% to 50% by weight of moisture, said reducing sugar and moisture being present in amounts normally susceptible to causing the loss of protein quality and further containing glycine or a soluble salt thereof in an amount of from about 0.25% to 1% by weight and effective to stabilize the protein quality.

2. An improved pet food composition according to claim 1 wherein the reducing sugar comprises a member selected from the group consisting of fructose, dextrose, glucose, maltose, corn syrup, and honey.

3. An improved pet food composition according to claim 1 which comprises having a PER of 2.5 or greater.

* * * * *